Dec. 23, 1952        A. DEJARDIN        2,622,370
MACHINE FOR WELDING VACUUM END-TUBES ONTO VACUUM-FLASKS
Filed Aug. 10, 1949        2 SHEETS—SHEET 1
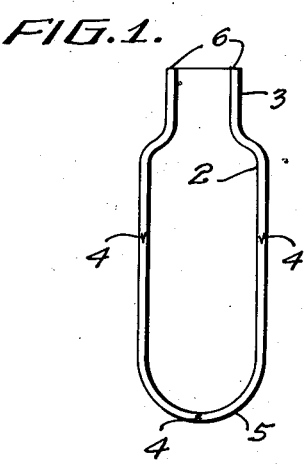
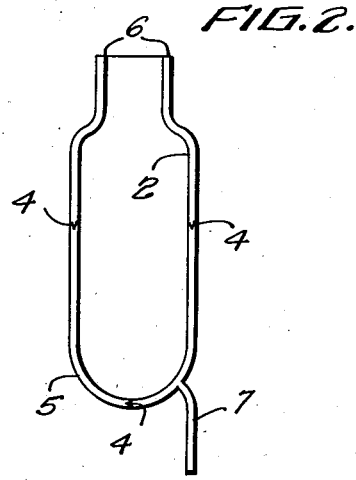
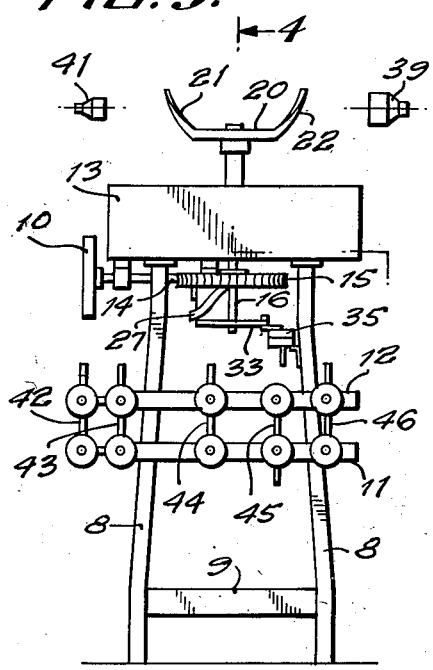
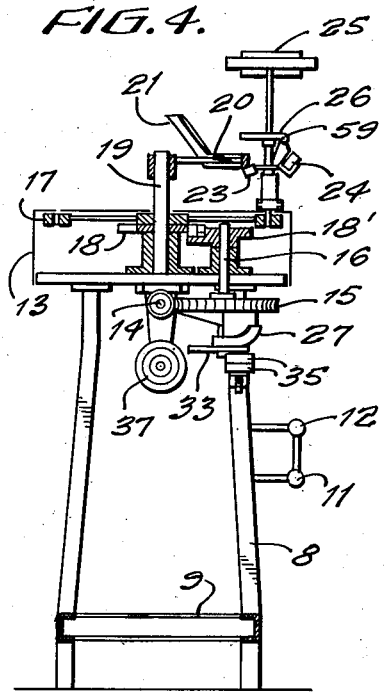
INVENTOR.
ARTHEME DEJARDIN
BY Dec. 23, 1952            A. DEJARDIN            2,622,370
MACHINE FOR WELDING VACUUM END-TUBES ONTO VACUUM-FLASKS
Filed Aug. 10, 1949            2 SHEETS—SHEET 2
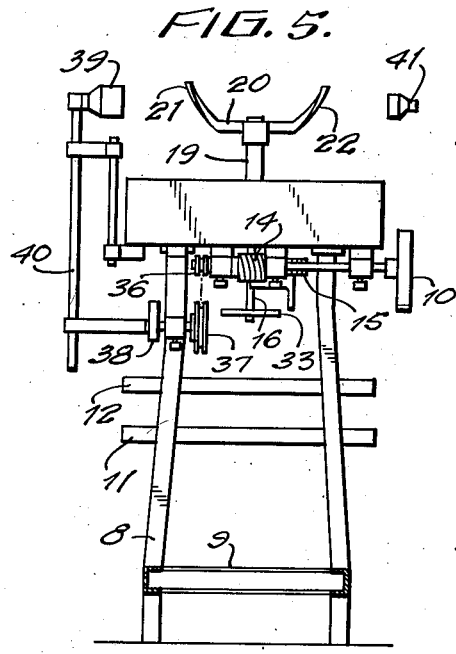
FIG. 5.
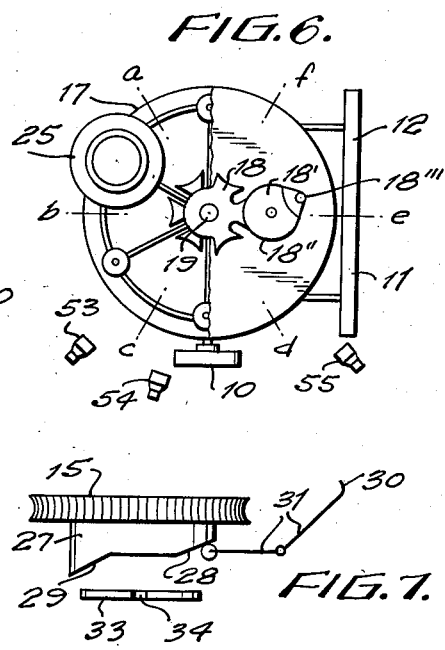
FIG. 6.
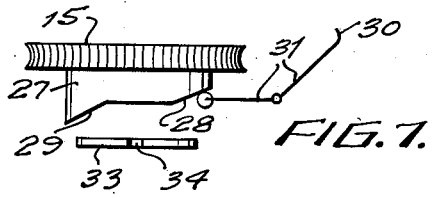
FIG. 7.
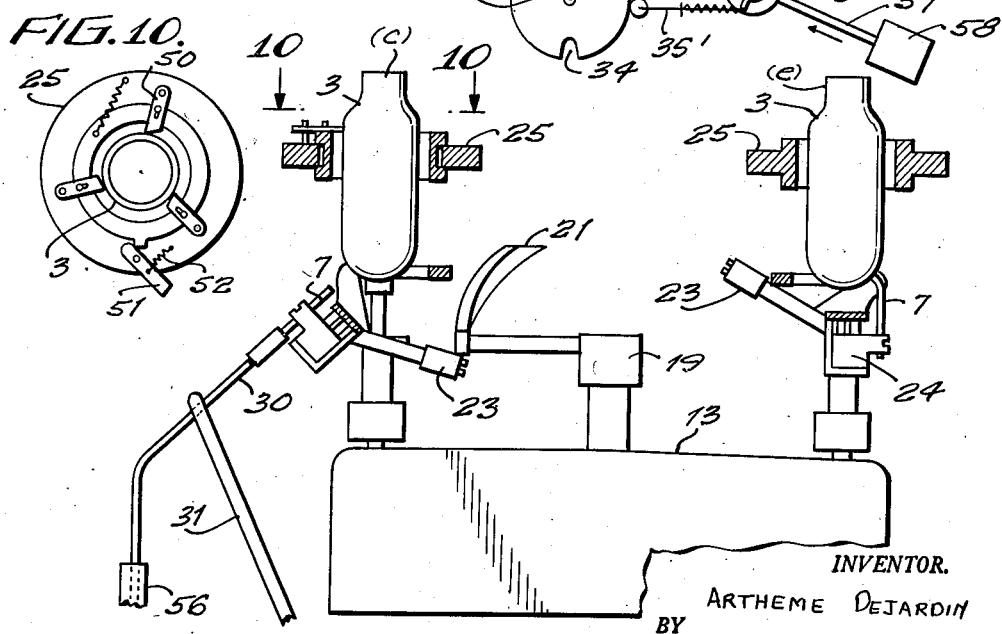
FIG. 8.
FIG. 10.
FIG. 9.
INVENTOR.
ARTHEME DEJARDIN
BY Patented Dec. 23, 1952

2,622,370

UNITED STATES PATENT OFFICE 2,622,370

MACHINE FOR WELDING VACUUM END-TUBES ONTO VACUUM FLASKS

Arthème Dejardin, Brussels-Stockel, Belgium

Application August 10, 1949, Serial No. 109,544
In Belgium September 10, 1948

3 Claims. (Cl. 49—1)

This invention relates to a machine for a determined step in the manufacture of glass flasks or holders which constitute the inner element of "Thermos" flasks with double partitions or walls and vacuum between inner and outer partition. In such flasks or bottles a liquid can be held for a considerable length of time at the same temperature as when introduced, for instance cold in summer and hot in winter through minimum exchange of heat through the walls of the flask.

In order to obtain a vacuum between the walls of these flasks or receivers, a tube has to be welded onto the outer wall, by hand, involving long and costly labour.

This invention has for object a machine for automatically carrying this step into effect and hereinafter called vacuum tubing machine, that is a machine for setting, welding, connecting to space between partition, heating and bending the tube to be later used for obtaining vacuum between said partitions and finally tempering the tube.

The only labour required consists in feeding the machine with bottles or flasks and tubes and removing the bottles with tubes welded thereon after those operations.

The machine according to the invention, comprises a rotating plate or disc carrying a series of tongs or nippers for holding the bottles and driven through an element shaped as a Maltese cross, itself driven by a cam, in such a manner that each flask carrying nipper travels from one position to the following position at a speed corresponding to the speed of the cam and remains in each position during a period equal to the duration of a revolution of the cam for engaging the following branch of the cross member.

Further, the machine comprises several sets of cams and a guiding track which in due sequence and during their displacements and that of the driven rotating plate carry out the following operations.

First, in position No. 1, a bottle or flask to which a vacuum tube is to be welded, is laid on a bottle carrying nipper together with the tube to be welded to the bottle and this parallelly to the axis of the bottle. The bottle and the tube are laid in their respective positions by means of supports provided with suitable abutments.

In position No. 2, pre-heating of the welding point on the side of the bottle is realized by a gas blow-pipe jet.

In the third position several operations are carried out. The tube is brought in a position at about 45° in relation to the vertical axis of the bottle by rotation of the tube carrying nipple, through action of a cam. The tube is brought opposite a hollow pushing rod or element connected to a compressed air supply such as a compressor.

The welding point or surface on the side of the bottle and afterwards the tip or end of the tube are heated by gas blow-pipe jets the tube and bottle being brought nearer to one another by a first relative movement. After this, a second displacement bringing closer together the tube and bottle, results in the formation of a recess in the outer wall of the bottle. At this moment compressed air is blown through the pushing rod and the tube thus perforating the outer wall of the bottle. Said two displacements result from action of a double slope cam, and a lever controlling said pushing rod. Afterwards a slight recoil of the tube results in the withdrawal of the tip of the tube out of the space between the two walls or partitions of the bottle, into which it had slightly penetrated at the end of second displacement of the tube. This withdrawal slightly stretches the outer wall and the welding itself is thus ended. All these operations from bringing the tube to 45° in relation to the axis of the bottle up to the slight recoil of the tube occur in the third position, during rotation of the Maltese cross and before its next rotation to the fourth position.

In position No. 4, a gas blow-pipe jet heats an intermediate length of the tube which is still at 45° in relation to the vertical bottle. After this heating and when travelling from position No. 4 to position No. 5, the tube carrying nipple pivots in a reverse movement to that having brought the tube from the parallel to the 45° position and the tube is bent and brought again to the parallel position in relation to the axis of the bottle. This movement of the tube carrying nipple results from the action of a slope of the cam having brought about the position at 45°.

In the fifth position the welded and bent portions are tempered by a blow-pipe oscillating about an axis parallel to the axis of the bottle and driven by an eccentric.

Finally, in the sixth position, the bottle provided with its vacuum end-tube is removed and a fresh bottle and tube are substituted thereto in the first position or location for a new succession of the steps described above.

The driving mechanism is continuous for the various cams and the eccentric, but movement from one position of bottle carrying nipple to the next is periodical due to the combined cam and Maltese cross.

Further details and features of the invention will result from the following description of appended drawings embodying by way of example a machine according to the invention.

Figure 1 is a section through a bottle or flask as before placing thereon, a vacuum end-tube, by means of the machine and Figure 2 shows this bottle with tube after removal from the machine.

Fig. 3 shows a side elevational view of the machine of the present invention;

Fig. 4 shows a partially sectional side elevational view of the machine of Fig. 3 as viewed along line 4—4 of Fig. 3 in the direction of the arrows.

Fig. 5 shows an elevational view of the machine of Fig. 3 as viewed from the side opposite to that shown in Fig. 3;

Figure 6 is a top view, partly in section of the Maltese cross and its cam arrangement.

Figures 7 and 8 relate to diagrammatic details of two cams, given by way of example and Figure 9 is a front view of the upper part of the machine, with a bottle or flask in the third position and a bottle in the fifth position.

Fig. 10 is a section taken along line 10—10 of Fig. 9 and looking in the direction of the arrows.

The same reference numbers are used in the various figures for the same parts.

Manufacture of "Thermos" flasks comprises before placing the tube to be used for creating vacuum in assembling two bottle 2 and 3 (Figure 1) one in the other with spacing members 4 to maintain the bottles concentrically and spaced from one another after which the bottom 5 of outer bottle 3 is closed. After these preliminary steps a hole as shown Figure 1 is obtained. This is open at 6 at the top and this portion is closed in a following step. These preliminary and following steps have nothing in common with the object of the invention. In other words, the machine according to the invention is intended for operating on a bottle or double flask as shown Figure 1, in the course of manufacture, in order to weld thereon a tube of small diameter to allow vacuum to be created between the bottles or flasks 2 and 3, after light reflection coating and closing of the neck at 6 which constitute two steps having nothing whatever to do with the operations of the machine described hereafter and which has for sole object to weld a glass end-tube in order to obtain an insulating flask, unachieved but provided with an end-tube communicating with the space between 2 and 3 and the axis of which is parallel to the longitudinal axis of flasks 2—3, as shown Figure 2.

On a frame 8 are fixed a support 9 for the driving motor (not shown) to be connected to pulley 10 and two gas feeder pipes 11 and 12 with hand regulated cocks according to the heating value and/or pressure of the gas for the blow-pipes. Five blow-pipes are fed by five feeders connected to said pipes. The continuous driving mechanism is erected above these pipes with certain cams and an eccentric and at the top of frame 8, a casing 13 contains a plate, Maltese cross and driving cam thereof (Figures 4 and 6).

The driving mechanism comprises pulley 10 on the shaft of which is mounted a worm 14 engaging a worm wheel 15 and imparting thereto a continuous rotation about a vertical axis 16 (Figures 3, 4 and 5). On said axis 16 various cams mentioned hereafter are secured.

In the middle of the frame a rotating plate 17 (Figures 4 and 6) is angularly wedged to a six arm Maltese cross 18, said plate and cross being free to rotate on the central vertical shaft 19. At its upper part, shaft 16 bears a cam 18'. This cam with its center on shaft 16 comprises part of a circumference 18'' which engages the indentation of one of the six Maltese cross arms, without any action thereon. A finger 18''' after each revolution of the cam, periodically moves the Maltese cross angularly through one sixth of a revolution by engagement of finger 18''' between two adjoining arms of the Maltese cross.

A stationary cam 20 at the top of the frame 8 first puts the end-tube in a 45° position in relation to the axis of the bottle through a first sloping track 21 and afterwards effects its bending parallelly to the axis of the bottle by a second sloping track 22, during rotation of plate 17. To that end an arm 23 provided with a roller follows the profile of said stationary cam 21—20—22 and thus operates angular displacements of the end-tube in relation to the bottle, the tube carrying nipple 24 being pivotally mounted about pivot 59 (Fig. 4) and connected to said arm 23, and being heavier than said arm 23 so as to cause said arm to tend to rotate in a clockwise direction, as viewed in Fig. 4, and thereby cause the roller on said arm to follow said cam 21—20—22. The tube carrying nipple 24 holds the tube 7 by any conventional means, such as spring clips, for example. This nipple is mounted on a nipple or bottle carrying sheath 25 with an abutment 26 for regulating position and correct location of the bottle for example by three spring clasps or pushing elements 50 at 120° one from the other and under control of a hand grip 51 and spring 52 for introduction of a bottle in first position and removal in sixth position.

The plate 17 carries six bottle carrying nipples at 60° one from the other round the periphery of plate 17, and which in each position of the six arm Maltese cross 18, corresponds with the six operations of the cycle previously described.

Under gear wheel 15 and angularly wedged thereto is mounted a circular cam 27 with two sloping tracks, the profile of which is shown Figure 7. This cam 27 comprises two slopes 28 and 29, which during rotation with gear wheel 15 result in a two step movement by which tube 7 and bottle 3 are brought nearer to one another by pushing rod 30 (Figure 9) by means of a crank lever 31, pivoted at 32 (Figure 7). The weight of said rod 30 tends to rotate crank 31 in a clockwise direction as viewed in Fig. 7 and so causes the follower on the end of crank 31 to continually bear against circular cam 27. Below cam 27, another cam 33 slotted at 34 is located and at regular intervals opens an air blowing valve 35 (Figures 3, 4, 7 and 8) for instance by a pushing element 35' provided with a roller.

At the end of the worm shaft 14, a pulley through a connection 37 drives an eccentric 38 which oscillates a blow-pipe 39 about a vertical axis 40.

Figure 6, the Maltese cross 18 is shown as seen from underneath, with six angular positions, plate 17 bearing six bottles bearing nipples 25 at 60° one from the other, positions Nos. 1 to 6 being referred to by a, b, c, d, e and f.

In position a (first position) the bottle to which an end-tube is to be welded is put in its location together with the end-tube to be welded thereon, said tube in a tube carrying nipple pivoted on the bottle carrying nipple. In position b a double jet or dart blow-pipe 41, pre-heats the welding point on outer bottle 3. In the third position c two independent darts 53 and 54 concentrate their heating first on the welding point on outer bottle 3 and then on the head or tip of the end-tube when neared by its first movement, up to proximity of the wall of bottle 3 (Figure 9), before actual welding.

In fourth position d a fourth gas dart 55 heats the portion of end-tube to be bent after welding and in fifth position e an oscillating dart blow-pipe 39 anneals the welded and bent parts. Those five darts and air blowers are fed by side pipes 42, 43, 44, 45 and 46 (Figure 4) on feeders 11 and 12.

The two immediately preceding paragraphs give a description of the manner in which heat is applied to the bottle and tube in the various positions of the machine. The mechanical operation of the machine is as follows:

Shaft 16 on which are fixedly mounted cam 18′, gear wheel 15, and cam 33 rotates through one complete revolution during each one-sixth of a revolution of plate 17. Flasks 2—3 and tubes 17 are mounted at each of the above mentioned six positions and the operations at these six positions occur simultaneously on the separate flasks and tubes located at the several positions.

At the first position a, the operator places a separate flask and tube into elements 25 and 24, respectively.

At the second position b, jet 41 preheats the welding point on outer bottle 3.

As the flask and tube rotate from second position b to third position c, the end of arm 23 contacts arm 21 of cam 21—20—22 thereby tilting the tube 7 to the angular position shown in the left-hand portion of Fig. 9. In this third position c, the hollow pusher rod 30, which is constructed so as to embrace and abut against the outer end of tube 7, pushes tube 7 closer to the flask due to the tilting of arm 31 by the action of the follower of arm 31 against sloping surface 28 of cam 27. Sloping surface 29 of cam 27 then causes pusher rod 30 to push the heated inner end of tube 7 into the heated surface of bottle 3. Directly thereafter cam 33 through rod 35′ causes valve 35 to open and admit compressed air to flow from tank 58 through tubes 57 and 56, then through the pusher rod 30 and tube 7 so as to pierce the heated portion of bottle 3, thereby providing an opening into the space between bottles 2 and 3 through tube 7. As the follower of arm 31 rolls off of sloping surface 29, arm 31 rotates in a clockwise direction as viewed in Fig. 7 and pusher rod 30 is drawn away from tube 7. The frictional contact between tube 7 and rod 30 is sufficient for rod 30 to give tube 7 a slight outward pull thereby pulling the end of tube 7 which has extended into bottle 3 out of bottle 3 and slightly stretching the outer wall of bottle 3. Cam 33 has in the meantime closed valve 35. At the end of the operations at this third position c, the tube 7 is joined to bottle 3 so as to provide an opening through tube 7 into the space between bottles 2 and 3, and tube 7 extends outwardly at an angle of 45° to the axis of the flask.

In the fourth position d, gas dart 55 heats an intermediate portion of tube 7.

In travelling from the fourth position to the fifth position e, the end of arm 23 travels along arm 22 of cam 21—20—22 and thereby straightens tube 7 so that it extends in a direction parallel to the axis of the bottle as shown in the right-hand portion of Fig. 9.

In the sixth position, the operator removes the flask with the tube joined thereto.

Figure 9 shows diagrammatically bottles 3 and tube 7 in third (c) and fifth (e) positions together with upper parts of the machine whereby the main features of the invention are clearly understood for anyone skilled in the art and also shows the results of the machine according to the means involved to obtain said results.

Without exceeding the scope of this patent, many modifications can be brought in the number, kind, form and constitution of parts of the described machine.

What I claim is:

1. A machine for joining an end of a glass tube to the surface of a glass bottle so that the tube opens into the interior of said bottle, comprising in combination, means for vertically mounting said tube and bottle on a horizontal rotatably mounted wheel comprising a Maltese cross having arms which correspond in number to the number of locations at which operations are to be performed on said tube and bottle; a cam rotatably mounted adjacent the outer end of one of said arms and shaped so as to rotate said wheel a distance equal to the distance between two of said arms during a relatively small part of one complete revolution of said cam, said wheel remaining stationary during the remaining part of one complete revolution of said cam; means operatively connected to said tube-mounting means for tilting, during the rotation of said wheel, said tube to a position where it extends angularly to the axis of said bottle and for tilting said tube back to its original position; means for heating, during one of said revolutions of said cam, said end of said tilted tube to be joined to said bottle and for heating the surface portion of said bottle to which the tube is to be joined so as to plasticize said surface portion; means for moving, during the same revolution of said cam, said heated end of said tube into said heated surface portion of said bottle; means for advancing, during the same revolution of said cam, a jet of fluid through said tube so as to pierce said heated portion of said bottle at the end of said tube; and means for heating said joined tube at an intermediate portion thereof, said heating of said tube enabling said operatively connected means to bend said joined tube back to a position where it is parallel to the axis of said bottle.

2. A machine for joining an end of a glass tube to the surface of a glass bottle so that the tube opens into the interior of said bottle, comprising in combination, means for vertically mounting said tube and bottle on a horizontal, rotatably mounted wheel comprising a Maltese cross having arms which correspond in number to the number of locations at which operations are to be performed on said tube and bottle; a cam rotatably mounted adjacent the outer end of one of said arms and shaped so as to rotate said wheel a distance equal to a distance between two of said arms, during a relatively small part of one complete revolution of said cam, said wheel remaining stationary during the remaining part of said one complete revolution of said cam; means operatively connected to said tube-mounting means for tilting, during the rotation of said wheel, said tube to a position where it extends angularly to said bottle and for tilting said tube back to its original position; a hollow pusher rod having an end shaped to embrace and abut against the other end of said tube and means for moving said rod so as to move the first-mentioned end of said tube close to the surface of said bottle; means for heating, during one of said revolutions of said cam, said first-mentioned end of said tilted tube to be joined to said bottle and for heating the surface portion of said bottle to which said tube is to be joined so as to plasticize said surface portion; means for actuating said rod so as to push, during the same revolution of said cam, said heated end of said tube into said heated surface portion of said bottle; means operatively connected to said rod for advancing, during the same revolution of said cam, a jet of fluid through said rod and tube so as to pierce said heated surface portion of said bottle at said heated end of said tube; and means for heating said joined tube at an intermediate portion thereof, said heating of said tube enabling said means operatively connected to said tube mounting means to bend said joined tube back to its original position.

3. A machine for joining an end of a glass tube to the surface of a glass bottle so that the tube opens into the interior of said bottle comprising in combination, a driven gear wheel fixedly mounted on a vertically supported shaft having a first cam and a second cam attached thereto; said first cam being mounted adjacent to a Maltese cross fixedly mounted on a horizontally and rotatably mounted wheel, said first cam being so shaped as to engage the arms of the Maltese cross during a small part of one revolution of said first cam and thereby move said wheel a distance corresponding to the distance between two of said arms of said Maltese cross; means on said wheel for vertically mounting a glass bottle and a glass tube adjacent thereto; cam means mounted on said wheel and means operatively connecting said cam means and said tube mounting means for tilting said tube into an angular position with respect to the axis of said bottle during one of said revolutions of said first cam; means for pushing the end of said tube to be joined to the surface of said bottle to a position adjacent said bottle surface during said revolution of said first cam, said means comprising a third cam fixedly mounted to the underside of said gear wheel and a follower arm operatively connected thereto having means to support a hollow push rod shaped at one end thereof so as to embracingly engage and abut against the end of said tube distant from said bottle surface, said third cam having one sloping portion which through said follower arm moves said hollow push rod a distance so as to push said first-mentioned end of the said tube to a point closely adjacent to the surface of said bottle; means for heating said end of said tube adjacent said bottle surface and for heating said bottle surface so as to plasticize said bottle surface, said third cam having another sloping portion which moves said hollow push rod a further distance so as to push said heated end of said tube adjacent said bottle into said heated bottle surface; means for advancing a jet of air through said hollow push rod and through said tube so as to pierce the heated portion of said bottle, said means comprising said second cam which is operatively connected to a valve so as to open a supply of air from a compressed air tank, operatively connected to said valve, through a flexible tube connected to said valve and the outer end of said hollow push rod, said third cam being so shaped as to withdraw said hollow push rod from said tube during the continued rotation of said gear wheel to which said third cam is attached; means for heating an intermediate portion of said tube during one of said revolutions of said first cam, said cam means mounted on said wheel being constructed so as to bend said tube back to its vertical position around said heated intermediate portion thereof; and a further rotation of said Maltese cross by said first cam delivering the bottle and tube joined thereto on said wheel to a further position where it may be removed by the operator.

ARTHÈME DEJARDIN.

REFERENCES CITED

The following references are of record in the file of this patent:

UNITED STATES PATENTS

| Number | Name | Date |
|---|---|---|
| 918,669 | Graybill | Apr. 20, 1909 |
| 1,591,175 | Mailey et al. | July 6, 1926 |
| 1,681,591 | Millar | Aug. 21, 1928 |
| 1,701,758 | Mailey et al. | Feb. 12, 1929 |
| 1,735,027 | Wetmore | Nov. 12, 1929 |
| 1,897,488 | Millar | Feb. 14, 1933 |
| 2,272,927 | Stager | Feb. 10, 1942 |
| 2,385,302 | Schellhaus, Jr. | Sept. 18, 1945 |
| 2,447,569 | Eisler | Aug. 24, 1948 |